UNITED STATES PATENT OFFICE.

MARTIN L. HILL, OF DALLAS, TEXAS.

BOILER-CLEANING COMPOUND.

SPECIFICATION forming part of Letters Patent No. 534,392, dated February 19, 1895.

Application filed May 18, 1894. Serial No. 511,707. (No specimens.)

*To all whom it may concern:*

Be it known that I, MARTIN L. HILL, a citizen of the United States, residing at Dallas, in the county of Dallas and State of Texas, have invented a new and useful Boiler-Cleaning Compound, of which the following is a specification.

The invention relates to an improvement in compounds for cleaning the scale or incrustation from boilers, and it consists of an improved compound having sodium hydrate for a base, and having certain subordinate ingredients whereby its efficiency is increased, and whereby the action of the sodium hydrate is so modified that no detriment to the boiler iron will result.

The compound is composed of acetate of potash, volatile oil of eucalyptus, tannin, sodium hydrate, pure water and tin crystals. These ingredients are combined in the following manner: Take the sodium hydrate and dissolve it in fifty parts of water, the sodium hydrate being of ten parts. One part oil of eucalyptus is next added and thoroughly combined with the mixture, after which one hundred and eighty parts of additional water are added to the mixture, the water having been previously combined with one-half a part of acetate of potash and one part of tin crystals. The mixture should now be violently and constantly agitated, so as to effect a thorough combining of the parts, and so as to assist the ingredients in the chemical combination which will take place upon their association. The mixture is completed by adding one-tenth part of tannin. After this has become thoroughly combined with the other elements, the compound is ready for use, which is effected by introducing it into the boiler, as is understood.

The purpose of the particular ingredients, and the manner of compounding them, is to make the operation of the compound more effective as to the removal of the incrustation, and to prevent any detrimental influence to the boiler. This end is attained, owing to the chemical affinity between the several ingredients. By these means the sodium hydrate is modified in one respect and assisted in the other.

Having described my invention, what I claim is—

A boiler cleaning compound composed of water, sodium hydrate, oil of eucalyptus, tannin, acetate of potash and tin crystals, combined substantially as described.

In testimony that I claim the foregoing as my own I have hereto affixed my signature in the presence of two witnesses.

MARTIN L. HILL.

Witnesses:
A. W. S. CRIPTURE,
J. N. LARKIN.